(12) United States Patent
Park et al.

(10) Patent No.: US 11,615,207 B2
(45) Date of Patent: Mar. 28, 2023

(54) SECURITY PROCESSOR CONFIGURED TO AUTHENTICATE USER AND AUTHORIZE USER FOR USER DATA AND COMPUTING SYSTEM INCLUDING THE SAME

(71) Applicant: SAMSUNG ELECTRONICS CO., LTD., Suwon-si (KR)

(72) Inventors: Keunyoung Park, Seongnam-si (KR); Dongjin Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

(21) Appl. No.: 17/027,824

(22) Filed: Sep. 22, 2020

(65) Prior Publication Data

US 2021/0165909 A1 Jun. 3, 2021

(30) Foreign Application Priority Data

Dec. 3, 2019 (KR) .................. 10-2019-0159351

(51) Int. Cl.
G06F 21/62 (2013.01)
G06F 21/60 (2013.01)
H04L 9/08 (2006.01)
H04L 9/30 (2006.01)

(52) U.S. Cl.
CPC ........ *G06F 21/6245* (2013.01); *G06F 21/602* (2013.01); *H04L 9/0869* (2013.01); *H04L 9/0891* (2013.01); *H04L 9/30* (2013.01)

(58) Field of Classification Search
CPC .............. G06F 21/6245; G06F 21/602; G06F 11/3648; G06F 11/366; G06F 21/44; G06F 21/606; G06F 21/6218; G06F 21/72; G06F 21/78; G06F 2221/2141; G06F 21/31; G06F 21/604; G06F 21/62; H04L 9/0869; H04L 9/0891; H04L 9/30; H04L 9/0822; H04L 9/0825; H04L 9/0894; H04L 9/14; H04L 9/3226; H04L 63/062; H04L 63/083; H04L 9/0861
USPC ....................................................... 713/182
See application file for complete search history.

(56) References Cited

U.S. PATENT DOCUMENTS 7,155,616 B1 * 12/2006 Hamlin ................. H04L 63/083
713/193
8,838,950 B2 9/2014 Craft et al.
8,856,544 B2 10/2014 Bosch et al.
9,111,097 B2 8/2015 Kiiveri et al.
9,135,472 B2 9/2015 Smith et al.
9,171,133 B2 10/2015 Bettendorff
9,171,187 B2 10/2015 Asokan et al.
9,286,152 B2 3/2016 Semenko et al.
9,607,177 B2 3/2017 Jejurikar et al.
(Continued)

OTHER PUBLICATIONS

EESR Issued Mar. 30, 2021 In Corresponding Ep Patent Application No. 20205767.5.

*Primary Examiner* — Jacob Lipman
(74) *Attorney, Agent, or Firm* — F. Chau & Associates, LLC

(57) ABSTRACT

A security processor includes a key generator circuit configured to randomly generate a key, an encryption circuit configured to encrypt user data based on the key, and a security manager circuit configured to receive a first user identification (ID), which uniquely corresponds to a user of a device, and determine whether to allow access to the user data by authenticating the first user ID.

19 Claims, 15 Drawing Sheets

(56) References Cited

U.S. PATENT DOCUMENTS

| | | | |
|---|---|---|---|
| 2007/0043978 A1* | 2/2007 | Cruzado | G06F 21/86 |
| | | | 714/38.1 |
| 2008/0089517 A1 | 4/2008 | Bianco et al. | |
| 2008/0095375 A1* | 4/2008 | Tateoka | H04L 9/085 |
| | | | 380/282 |
| 2008/0205651 A1 | 8/2008 | Goto et al. | |
| 2013/0073854 A1* | 3/2013 | Patti | H04L 9/0894 |
| | | | 713/171 |
| 2013/0282951 A1 | 10/2013 | Kuo et al. | |
| 2016/0012241 A1 | 1/2016 | Touzni et al. | |
| 2018/0048470 A1 | 2/2018 | Bower, III et al. | |

* cited by examiner

| ID_Key1 | ID_User1 | Key1 | Rg1 |
| ID_Key2 | ID_User1 | Key2 | Rg2 |
| ID_Key3 | ID_User2 | Key3 | Rg3 |

List_Key

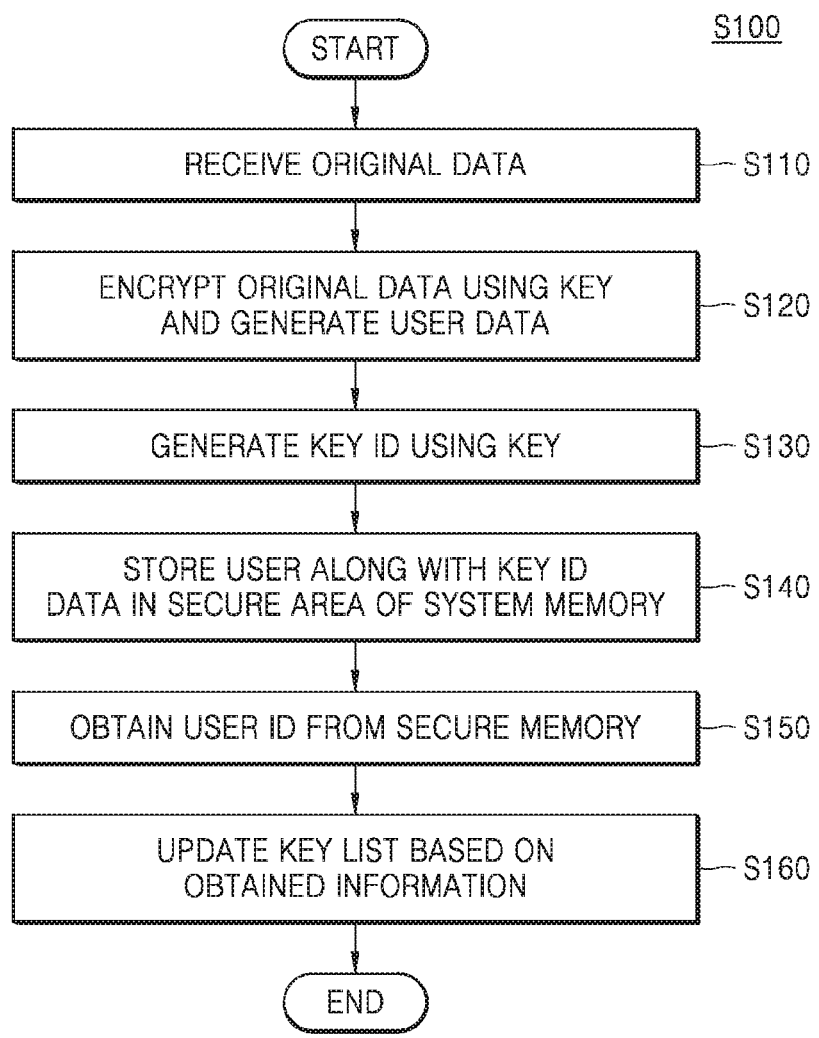

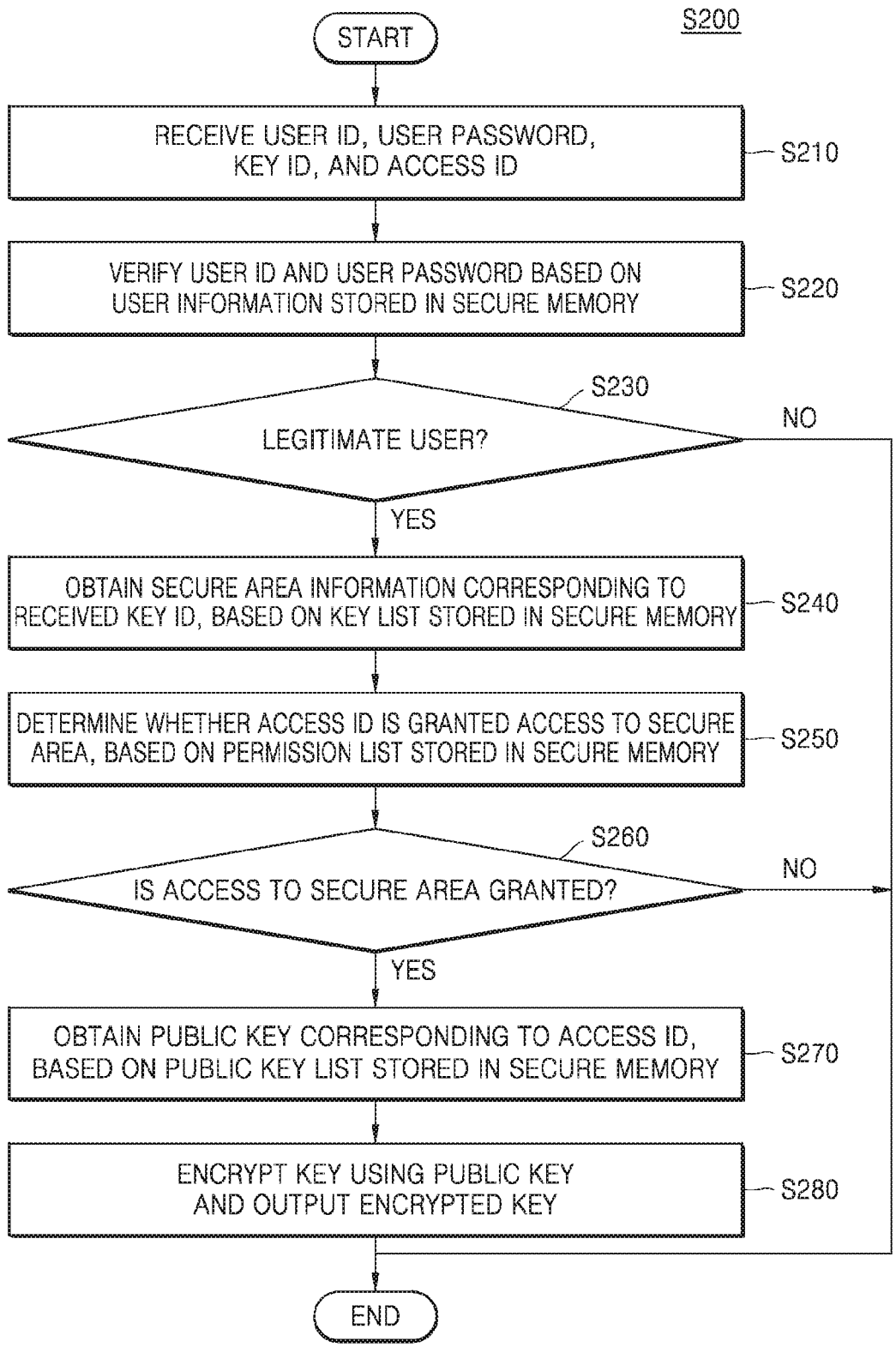

SECURITY PROCESSOR CONFIGURED TO AUTHENTICATE USER AND AUTHORIZE USER FOR USER DATA AND COMPUTING SYSTEM INCLUDING THE SAME

CROSS-REFERENCE TO RELATED APPLICATIONS

This application claims priority under 35 U.S.C. § 119 to Korean Patent Application No. 10-2019-0159351, filed on Dec. 3, 2019 in the Korean Intellectual Property Office, the disclosure of which is incorporated by reference herein in its entirety.

TECHNICAL FIELD

Exemplary embodiments of the inventive concept relate to a security processor and a computing system, and more particularly, to a security processor configured to authenticate a user and authorize the user for user data, and a computing system including the security processor.

DISCUSSION OF THE RELATED ART

When a failure occurs during an operation of a semiconductor device or a system, information stored in a memory may be utilized to detect the cause of the failure and perform a debugging operation. To obtain the information, a memory dump technique of extracting data stored in the memory as it is may be used.

However, the memory may store not only security data that requires security, but also normal data that does not require security. When a failure occurs, although a third party may be granted a memory dump operation for the normal data, since the third party is not authorized for security data including private information, the third party should not be granted a memory dump operation for the security data. Nevertheless, there may be situations in which the security data should be analyzed via a memory dump operation to detect an exact cause of the failure.

SUMMARY

Exemplary embodiments of the inventive concept provide a security processor configured to perform authentication operations on a user and a debugger when the debugger is authorized to access user data that requires security, and a computing system including the security processor.

According to an aspect of the inventive concept, there is provided a security processor including a key generator circuit configured to randomly generate a key, an encryption circuit configured to encrypt user data based on the key, and a security manager circuit configured to receive a first user identification (ID), which uniquely corresponds to a user of a device, and determine whether to allow access to the user data by authenticating the first user ID.

According to an aspect of the inventive concept, there is provided a computing system including a security processor configured to randomly generate a key and encrypt user data based on the key, and a system memory configured to store the encrypted user data in any one of a plurality of secure areas. The security processor receives a first user ID, which uniquely corresponds to a user of a device, and determines whether to allow access to a first secure area in which the user data is stored, from among the plurality of secure areas, by authenticating the first user ID.

According to an aspect of the inventive concept, there is provided a diagnostic system including a computing system configured to randomly generate a key, encrypt user data based on the key, and store encrypted user data, and a debugger configured to output an access ID to the computing system, obtain the user data, and diagnose an error in the computing system. The computing system determines whether the access ID is an authorized access ID having access authority for the user data, and authorizes the debugger to access the user data based on the determination result.

According to an aspect of the inventive concept, a method of performing a memory dump operation on both security data and normal data, and providing the security data only to an authorized person while maintaining security stability, is provided.

BRIEF DESCRIPTION OF THE DRAWINGS

The above and other features of the inventive concept will become more apparent by describing in detail exemplary embodiments thereof with reference to the accompanying drawings, in which:

FIG. 6 is a flowchart illustrating an operation of a security processor according to an exemplary embodiment.

FIG. 8 is a flowchart illustrating an operation of a security processor according to an exemplary embodiment.

DETAILED DESCRIPTION OF THE EXEMPLARY EMBODIMENTS

Figure 1:
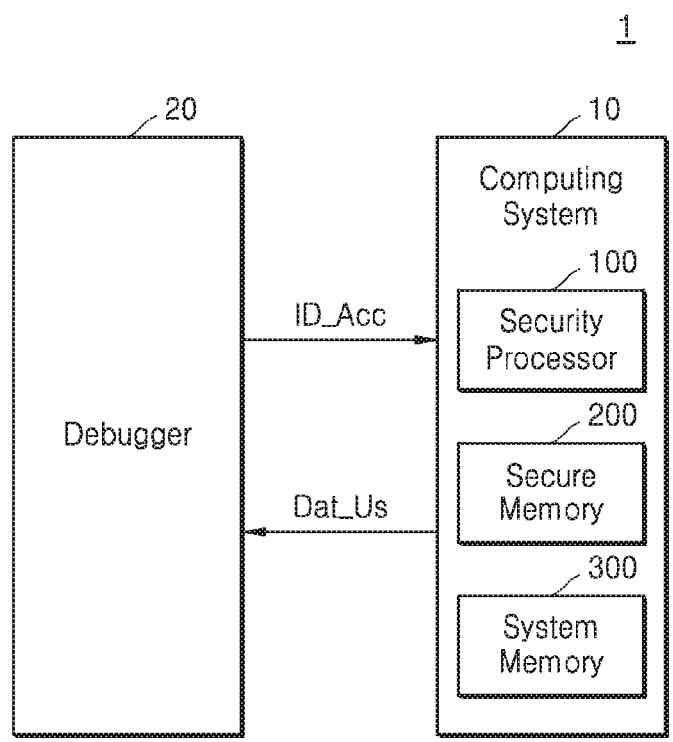
FIG. 1 is a block diagram of a diagnostic system according to an exemplary embodiment.

Exemplary embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

It should be understood that descriptions of features or aspects within each exemplary embodiment should typically be considered as available for other similar features or aspects in other exemplary embodiments, unless the context clearly indicates otherwise.

As used herein, the singular forms "a", "an" and "the" are intended to include the plural forms as well, unless the context clearly indicates otherwise.

FIG. 1 is a block diagram of a diagnostic system 1 according to an exemplary embodiment.

Referring to FIG. 1, the diagnostic system 1 may include a computing system 10 and a debugger 20. When a malfunction (e.g., a system failure) occurs in the computing system 10, the debugger 20 may receive user data Dat_Us stored in the computing system 10, analyze the user data Dat_Us, and diagnose the cause of the malfunction in the computing system 10. In an example, the debugger 20 may be used by a manufacturer of the computing system 10, a manufacturer of hardware included in the computing system 10, or a manufacturer of software utilized in the computing system 10. The debugger 20 may collectively refer to a computing system capable of communicating with the computing system 10 and receiving information stored in a system memory 300. Thus, the debugger 20 may also be referred to herein as a debugging computing system. As used herein, the user data Dat_Us may refer to data stored in the computing system 10 that is to be secured. For example, the user data Dat_Us may be sensitive data to be protected. In an example, the user data Dat_Us may include private information about a user or system information that is to be secured.

The debugger 20 may output an access ID ID_Acc, which is unique to the debugger 20, to the computing system 10, and the computing system 10 may determine whether the debugger 20 has authority to access security data based on the access ID ID_Acc. In an exemplary embodiment, the computing system 10 may request a user ID from the user, and may determine whether the user is a legitimate party authorized to access the user data Dat_Us using the user ID received from the user. The user ID provided by the user may be stored in the computing system 10 to enable the identification of the user. In an example, the user ID may be authentication information relating to the user and may include, for example, a password, pattern information, fingerprint information, face recognition information, or iris information. In another example, the computing system 10 may determine whether the user is a legitimate party authorized to access the user data Dat_Us using a user ID previously stored in the computing system 10.

The computing system 10 may output the user data Dat_Us to the debugger 20 only when the user is a legitimate party authorized to access the user data Dat_Us, as will be described in detail below with reference to FIGS. 5 to 12.

The computing system 10 may refer to a system configured to perform operations using a semiconductor device and may perform various functions. In an example, the computing system 10 may include a System-on-Chip (SoC), a mobile device, a desktop computer, a server, or an Internet of Things (IoT) device.

The computing system 10 may include a security processor 100, a secure memory 200, and the system memory 300. The secure memory 200 may be a memory which only the security processor 100 is able to access. For example, in an exemplary embodiment, the security processor 100 may be the only component in the computing system 10 permitted to access the secure memory 200. For example, the debugger 20 is not able to access the secure memory 200. In an exemplary embodiment, the secure memory 200 may include a non-volatile memory configured to retain stored data even when a power supply is interrupted. However, the inventive concept is not limited thereto, and the secure memory 200 may include a volatile memory. In an example, the secure memory 200 may include NAND flash memory, vertical NAND flash memory, NOR flash memory, resistive random access memory (RRAM), phase-change memory, or magnetoresistive RAM (MRAM).

The system memory 300 may be a memory which the debugger 20 and the computing system 10 are able to access. For example, in an exemplary embodiment, only the security processor 100 is able to access the secure memory 200, and the debugger 20 and the computing system 10 are able to access the system memory 300. The debugger 20 may make an access request for the system memory 300 to the computing system 10 and may obtain data stored in the system memory 300 through an interface (e.g., a universal serial bus (USB) and a universal asynchronous receiver/transmitter (UART) serial port) provided by the computing system 10. In an exemplary embodiment, although the system memory 300 may include a volatile memory that loses stored data when a power supply is interrupted, the inventive concept is not limited thereto, and the system memory 300 may include a non-volatile memory. In an example, the system memory 300 may include static RAM (SRAM), dynamic RAM (DRAM), a latch, a flip-flop, or a register.

The computing system 10 may store user data Dat_Us in the system memory 300. The user data Dat_Us may be encrypted with a randomly generated key. In an exemplary embodiment, the randomly generated key may be generated pseudorandomly, for example, from a seed. In an exemplary embodiment, the randomly generated key may be a value selected randomly from among a range of values using a random or pseudorandom number generator. The computing system 10 according to an exemplary embodiment may encrypt respective pieces of user data Dat_Us using different keys and may store information about the keys and the user data Dat_Us in different secure areas of the system memory 300. As used herein, a secure area may refer to an area in which security data is stored in the system memory 300, and the computing system 10 may allow access to the secure area only when the computing system 10 operates in a security mode.

The security processor 100 may include a key for encrypting the user data Dat_Us and may encrypt the user data Dat_Us using the generated key. In an exemplary embodiment, the security processor 100 may be secured such that the security processor 100 is not directly accessed by other components of the computing system 10 or an external component (e.g., the debugger 20). In an example, the security processor 100 may communicate with the computing system 10 using a mail box protocol.

The security processor 100 may store the secure area in which the user data Dat_Us is stored and correspondence information about the key used to encrypt the user data Dat_Us in the secure memory 200. Because components other than the security processor 100 are unable to access the secure memory 200, in exemplary embodiments, the information about the key is not accessible to other components of the computing system 10 or an external component (e.g., the debugger 20). That is, in exemplary embodiments, the information about the key can only be accessed by the security processor 100, and is not accessed by other components of the computing system 10 or an external component (e.g., the debugger 20).

According to an exemplary embodiment, the security processor 100 may store a user ID of a user having legitimate authority to access the user data Dat_Us along with information about the key in the secure memory 200. When the debugger 20 requests the user data Dat_Us, the security processor 100 may receive the user ID (e.g., user authentication information) of the user, and may output the information about the key to the debugger 20 only when the received user ID matches the user ID stored in the secure memory 200.

The user data Dat_Us may be accessed by the outside (e.g., the debugger 20) only when the security processor 100 according to an exemplary embodiment obtains permission of a user having legitimate authority to access the user data Dat_Us. Accordingly, the security of the user data Dat_Us may be increased. Also, the security processor 100 may keep information about the permission of the user. Accordingly, the information about the permission of the user may be subsequently used to prevent the denial of information being output.

According to an exemplary embodiment, the security processor 100 may store the access ID ID_Acc of the debugger 20 in the secure memory 200 along with information about the secure area in which the user data Dat_Us is stored. The security processor 100 may determine whether the debugger 20 is authorized to access the user data Dat_Us and should be granted access to the user data Dat_Us based on the information stored in the secure memory 200, and may output the information about the key to the debugger 20 only when the debugger 20 is able to access the user data Dat_Us (e.g., only when the security processor 100 determines that the debugger 20 is to be granted access based on the information stored in the secure memory 200).

The security processor 100 according to an exemplary embodiment may determine whether the debugger 20 has access authority for the user data Dat_Us based on the information stored in the secure memory 200. The security processor 100 may output information about the key corresponding to the user data Dat_Us to the debugger 20 only when the debugger 20 has access authority for the user data Dat_Us, thus increasing the security of the user data Dat_Us. Herein, when the debugger 20 or a user is described as having access authority for the user data Dat_Us, it may mean that the debugger 20 or the user is authorized to access the user data Dat_Us and should be granted access to the user data Dat_Us.

The debugger 20 may receive the user data Dat_Us and information about a key used to encrypt the user data Dat_Us from the computing system 10 and may decrypt the user data Dat_Us. In an exemplary embodiment, the computing system 10 may encrypt the key, which has been used to encrypt the user data Dat_Us, by using a public key uniquely provided by the debugger 20. The debugger 20 may decrypt the encrypted key using a private key corresponding to the public key and obtain a key. Also, the debugger 20 may decrypt the user data Dat_Us using the obtained key.

To this end, the debugger 20 may include a key decryption unit configured to decrypt the encrypted key, a data decryption unit configured to decrypt the user data Dat_Us, and a private key management unit configured to manage the private key corresponding to the public key.

Figure 2:
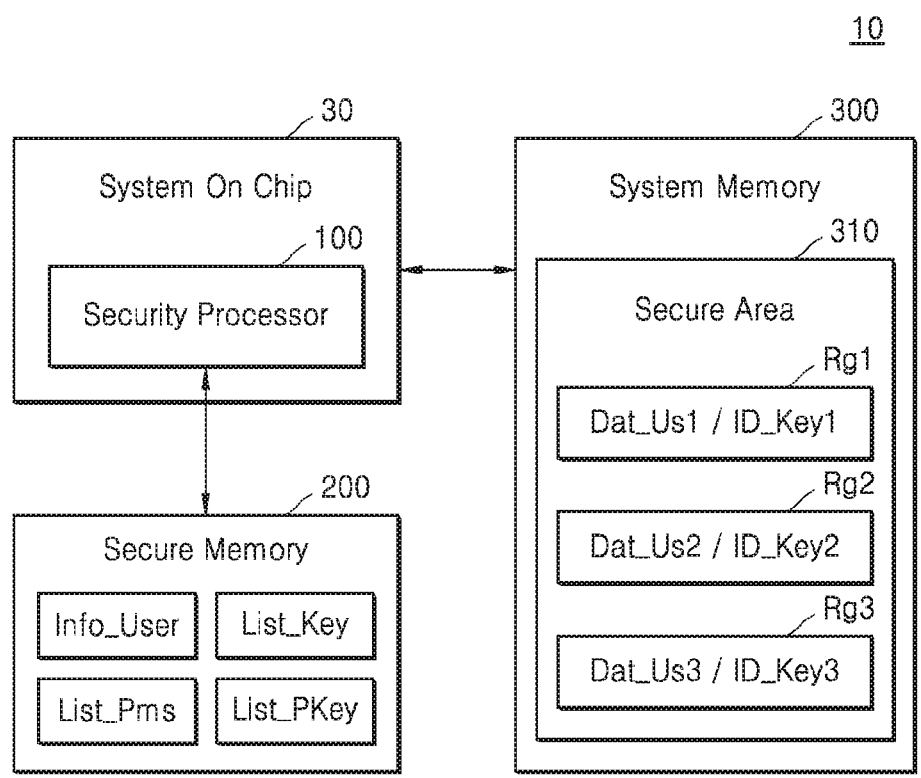
FIG. 2 is a diagram of a computing system according to an exemplary embodiment.

FIG. 2 is a diagram of the computing system 10 according to an exemplary embodiment. For convenience of explanation, a further description of elements and technical aspects previously described may be omitted.

Referring to FIG. 2, the computing system 10 may include an SoC 30, the secure memory 200, and the system memory 300, and the SoC 30 may include the security processor 100.

The secure memory 200 may be directly connected to the security processor 100 in the SoC 30. The security processor 100 may store user information Info_User, a key list List_Key, a permission list List_Pms, and a public key list List_PKey in the secure memory 200.

The user information Info_User may include a user ID and a user password of a user currently using the computing system 10. In an example, the user ID may be an identifier uniquely owned by (e.g., uniquely corresponding to) the user of a device (e.g., the computing system 10). For example, the user ID may include a logic ID for running an operating system (OS) and/or a login ID for driving the computing system 10.

The user password may be, for example, unique information that only the user knows, or biometric information about the user. In an example, the user password may include a login password for running an OS, a login password for driving the computing system 10, user fingerprint information, a user input pattern, or user iris information, as will be described in detail below with reference to FIG. 4A.

The key list List_Key may include a key used to encrypt user data (e.g., first to third user data Dat_US1 to Dat_US3), key IDs (e.g., first to third key IDs ID_Key1 to ID_Key3) corresponding to the key, information about a secure area 310 in which the first to third user data Dat_US1 to Dat_US3 is stored, and a user ID of a user having legitimate authority to access the first to third user data Dat_US1 to Dat_US3, as will be described in detail below with reference to FIG. 4B.

The permission list List_Pms may include an access ID, which is unique to the debugger (refer to 20 in FIG. 1) configured to make an access request for the first to third user data Dat_US1 to Dat_US3, information about the secure area 310 in which the user data Dat_US1 to Dat_US3 is stored, and information about whether the debugger (refer to 20 in FIG. 1) is granted the access request for the first to third user data Dat_US1 to Dat_US3, as will be described in detail below with reference to FIG. 4C.

The public key list List_PKey may include an access ID, which is unique to the debugger 20, and information about a public key distributed by the debugger 20, as will be described in detail below with reference to FIG. 4D.

The system memory 300 may be connected to the SoC 30, and the security processor 100 may communicate with the system memory 300 through an internal component of the SoC 30. The system memory 300 may include the secure area 310, which may be accessed when the computing system 10 operates in the security mode, and different pieces of user data (e.g., the first to third user data Dat_US1 to Dat_US3) may be stored in respective areas of the secure area 310.

The first user data Dat_US1 may be stored in a first area Rg1 of the secure area 310, and the first key ID ID_Key1 corresponding to a first key used to encrypt the first user data Dat_US1 may be stored together in the first area Rg1. The second user data Dat_US2 may be stored in a second area Rg2 of the secure area 310, and the second key ID ID_Key2 corresponding to a second key used to encrypt the second user data Dat_US2 may be stored together in the second area Rg2. The third user data Dat_US3 may be stored in a third area Rg3 of the secure area 310, and the third key ID ID_Key3 corresponding to a third key used to encrypt the third user data Dat_US3 may be stored together in the third area Rg3.

According to an exemplary embodiment, the secure area 310 of the system memory 300 may store different pieces of user data (e.g., first to third user data Dat_US1 to Dat_US3) together with the first to third key IDs ID_Key1 to ID_Key3 according to areas, as described above. The debugger (refer to 20 in FIG. 1) may obtain the first to third key IDs ID_Key1 to ID_Key3 stored in the secure area 310, and may request keys for the first to third user data Dat_US1 to Dat_US3 from the security processor 100 by using the first to third key IDs ID_Key1 to ID_Key3.

In an exemplary embodiment, in response to a request of the debugger 20, the security processor 100 may determine whether the debugger 20 is granted access to the first to third user data Dat_US1 to Dat_US3 stored in the secure area 310. In an exemplary embodiment, when it is determined that the debugger 20 is granted access to the first to third user data Dat_US1 to Dat_US3 stored in the secure area 310, the security processor 100 may output the requested first to third user data Dat_US1 to Dat_US3 and the key used to encrypt the first to third user data Dat_US1 to Dat_US3 (or a key encrypted using the public key) to the debugger 20. In an exemplary embodiment, when the debugger 20 is granted access to the first to third user data Dat_US1 to Dat_US3 stored in the secure area 310, the security processor 100 may output the first to third user data Dat_US1 to Dat_US3 without the key used to encrypt the first to third user data Dat_US1 to Dat_US3.

Although FIG. 2 illustrates an exemplary embodiment in which the secure memory 200 is an external component of the SoC 30, the inventive concept is not limited thereto, and the secure memory 200 may be an internal component of the SoC 30 or the security processor 100.

Figure 3:
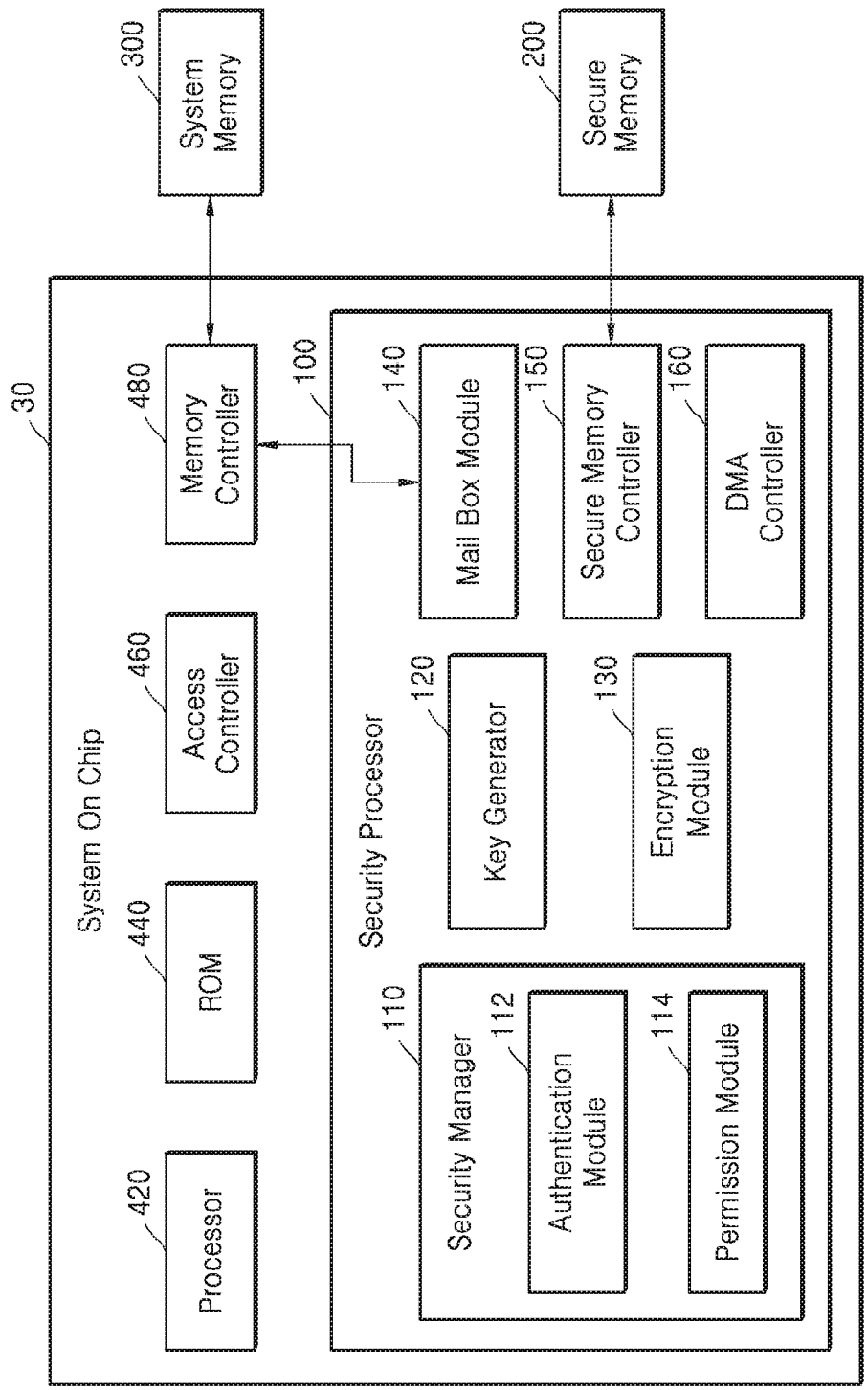
FIG. 3 is a diagram of a System-on-Chip (SoC) according to an exemplary embodiment.

FIG. 3 is a diagram of an SoC 30 according to an exemplary embodiment. For convenience of explanation, a further description of elements and technical aspects previously described may be omitted.

Referring to FIG. 3, the SoC 30 may include the security processor 100, a processor 420, read-only memory (ROM) 440, an access controller 460, and a memory controller 480.

The processor 420 may process the overall tasks of the SoC 30. In an exemplary embodiment, a plurality of processors 420 may output an authentication request to a user through various display devices in response to an access request of the debugger (refer to 20 in FIG. 1). In an example, the processor 420 may include a central processing unit (CPU) and/or a graphics processing unit (GPU), which includes at least one processing core.

The ROM 440 may store various program codes or control information required for the execution of an application or operations of the SoC 30. The access controller 460 may manage a security mode for a system memory 300. The access controller 460 may also be referred to herein as an access controller circuit. In an example, the access controller 460 may drive the SoC 30 in the security mode or in a normal mode, and may manage whether to access a secure area of the system memory 300.

The memory controller 480 may mange the system memory 300. In an example, the memory controller 480 may store user data received from the security processor 100 in the secure area of the system memory 300. The memory controller 480 may also be referred to herein as a memory controller circuit.

The security processor 100 may include a security manager 110, a key generator 120, an encryption module 130, a mail box module 140, a secure memory controller 150, and a direct memory access (DMA) controller 160. The security manager 110 may include an authentication module 112 and a permission module 114. In an example, operations of the security manager 110, which will be described below, may be actually performed by a central processing unit (CPU), ROM, and random access memory (RAM) that are included in the security processor 100. The security manager 110 may also be referred to herein as a security manager circuit, the key generator 120 may also be referred to herein as a key generator circuit, the encryption module 130 may also be referred to herein as an encryption circuit, the mail box module 140 may also be referred to herein as a mail box circuit, the secure memory controller 150 may also be referred to herein as a secure memory controller circuit, the DMA controller 160 may also be referred to herein as a DMA controller circuit, the authentication module 112 may also be referred to herein as an authentication circuit, and the permission module 114 may also be referred to herein as a permission circuit.

The security manager 110 may generate the key list List_Key, the permission list List_Pms, and the public key list List_PKey described above.

The authentication module 112 may determine whether a user ID obtained in response to making an authentication request to a user is a user ID having legitimate authority to access the user data, based on user authentication information provided by the user. In an exemplary embodiment, the authentication module 112 may receive a key list from the secure memory 200 and may determine whether a user ID included in the key list matches the user ID obtained from the user. Thus, the security manager 110, by way of the authentication module 112, may determine whether to allow access to the user data by authenticating the user ID obtained from the user.

The permission module 114 may determine whether to grant an access request for user data, which is received from the outside, based on an access ID received from the outside (e.g., the debugger 20 of FIG. 1). In an exemplary embodiment, the permission module 114 may receive a permission list from the secure memory 200 and may determine whether the access ID has been granted access to an area in which the user data is stored. For example, the permission module 114 may determine whether the access ID has access authority for the user data, and access to the user data may be granted or denied accordingly.

As described above, the key generator 120 may randomly generate a key. In an example, the key may be referred to as a data encryption key DEK. The key generator 120 may include a plurality of ring oscillators. The plurality of ring oscillators may generate randomly fluctuating signals, and the key generator 120 may generate keys having random numbers based on signals generated by the plurality of ring oscillators.

The encryption module 130 may encrypt input data using the key. In an exemplary embodiment, the encryption module 130 may encrypt original data using the key generated by the key generator 120 and generate user data, and the generated user data may be stored in the secure area of the system memory 300. In an exemplary embodiment, the encryption module 130 may encrypt the key, which has been used to encrypt the user data, by using a public key corresponding to the access ID. The encrypted key may be output to the outside (e.g., the debugger 20 of FIG. 1) through the mail box module 140. In an exemplary embodiment, information about the public key used to encrypt the key may be stored in the secure memory 200.

The mail box module 140 may perform data communication between the security processor 100 and a component located outside the security processor 100 using a mail box protocol. In an example, the mail box module 140 may include a storage device, and an external component (e.g., the processor 420) of the security processor 100 may store a command or data to be transmitted to the storage device so that the security processor 100 may communicate with the external component.

The secure memory controller 150 may manage the secure memory 200. In an exemplary embodiment in which the secure memory 200 is a non-volatile memory, the secure memory controller 150 may include a non-volatile memory controller. Upon a request from the security manager 110, the secure memory controller 150 may update user information, a key list, a permission list, and a public key list stored in the secure memory 200, or may read the user information, the key list, the permission list, and the public key list from the secure memory 200.

FIGS. 4A to 4D are diagrams showing information stored in a secure memory (e.g. the secure memory 200) according to an exemplary embodiment.

Figures 4A, 4B:
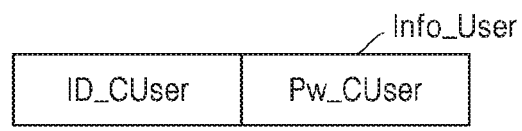
FIGS. 4A to 4D are diagrams showing information stored in a secure memory according to an exemplary embodiment.

Referring to FIGS. 2 and 4A, user information Info_User may include a current user ID ID_CUser and a current user password Pw_CUser. The current user ID ID_CUser may include an identifier of a user of the computing system 10. In an example, the current user ID ID_CUser may include various login IDs that the user has utilized while using the computing system 10. As used herein, the user may refer to a manager having management authority for the computing system 10 or an owner having ownership.

The current user password Pw_CUser may include unique information or biometric information that only a user having current management authority for the computing system 10 knows. In an example, the current user password Pw_CUser may include various pieces of biometric information or a password that the user has utilized while using (e.g., logging into) the computing system 10. In an exemplary embodiment, when user login information is changed, the computing system 10 may update the user information Info_User.

Referring to FIGS. 2 and 4B, a key list List_Key may include key IDs (e.g., first to third key IDs ID_Key1 to ID_Key3), user IDs (e.g., first and second user IDs ID_User1 and ID_User2), keys (e.g., first to third keys Key1 to Key3), and secure areas (e.g., first to third secure areas Rg1 to Rg3). The first to third key IDs ID_Key1 to ID_Key3 may indicate unique identifiers corresponding to the first to third keys Key1 to Key3. In an example, the first key ID ID_Key1 corresponding to the first key Key1 may be determined as '1,' the second key ID ID_Key2 corresponding to the second key Key2 may be determined as '2,' and the third key ID ID_Key3 corresponding to the third key Key3 may be determined as '3.'

The first and second user IDs ID_User1 and ID_User2 may indicate the first and second user IDs ID_User1 and ID_User2 corresponding to legitimate users having management authority for user data stored in the first to third secure areas Rg1 to Rg3. In an example, a unique identifier of a user having management authority for user data stored in the first area Rg1 and user data stored in the second area Rg2 may be input into the first user ID ID_User1, and a unique identifier of a user having management authority for user data stored in the third area Rg3 may be input into the second user ID ID_User2. The management authority for the user data ID_User1 and ID_User2 may include authority to access, generate, delete, and/or change the user data ID_User1 and ID_User2. In an example, during the generation of user data, the security processor 100 may input the current user ID ID_CUser included in the user information Info_User into the first and second user IDs ID_User1 and ID_User2 included in the key list Key_List.

In an exemplary embodiment, the same user may use the first and second user IDs ID_User1 and ID_User2, which are different from each other, depending on an application that the user uses. The first and second user IDs ID_User1 and ID_User2 may respectively correspond to a plurality of secure areas, which are different from each other. In an exemplary embodiment, the first and second user IDs ID_User1 and ID_User2 may include a plurality of user IDs, which are different from each other, according to a plurality of users of the computing system 10. The plurality of user IDs may respectively correspond to a plurality of secure areas, which are different from each other.

Each of the first to third keys Key1 to Key3 may be generated by the key generator (refer to 120 in FIG. 3). The first to third keys Key1 to Key3 may be used by the encryption module (refer to 130 in FIG. 3) to encrypt user data. Also, the first to third keys Key1 to Key3 may be differently determined for the respective secure areas Rg1 to Rg3 and may include random keys. In an example, the first to third keys Key1 to Key3 may be generated at the occurrence of a system crash. When new keys Key1 to Key3 are generated, new key IDs ID_Key1 to ID_Key3 corresponding to the keys Key1 to Key3 may be given.

In an example, the first key Key1 used to encrypt the user data stored in the first area Rg1 may be input to correspond to the first area Rg1 in the key list List_Key, the second key Key2 used to encrypt the user data stored in the second area Rg2 may be input to correspond to the second area Rg2 in the key list List_Key, and the third key Key3 used to encrypt the user data stored in the third area Rg3 may be input to correspond to the third area Rg3 in the key list List_Key.

Figure 4C:
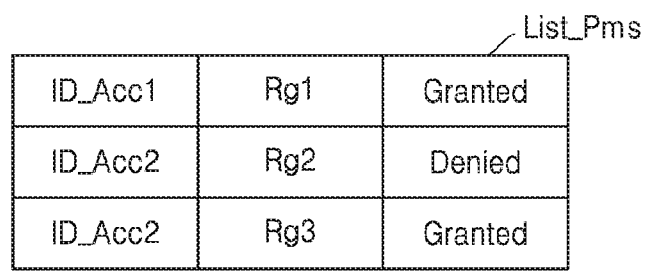

Referring to FIGS. 2 and 4C, a permission list List_Pms may include first and second access IDs ID_Acc1 and ID_Acc2, the first to third secure areas Rg1 to Rg3, and Granted/Denied statuses. The first and second access IDs ID_Acc1 and ID_Acc2 may indicate unique identifiers of debuggers (e.g., such as the debugger 20 in FIG. 1). In exemplary embodiments, the first and second access IDs ID_Acc1 and ID_Acc2 may indicate unique identifiers of users. The Granted/Denied statuses may indicate whether the debugger is granted or denied access to the first to third secure areas Rg1 to Rg3. In an example, a debugger having the first access ID ID_Acc1 may be granted access to the first area Rg1, and a debugger having the second access ID ID_Acc2 may be denied access to the second area Rg2 but may be granted access to the third area Rg3.

In an exemplary embodiment, the computing system 10 may previously store an access ID of a debugger, which may access the computing system 10, during an operation of manufacturing the computing system 10. In an exemplary embodiment, when the access ID of the debugger that has accessed the computing system 10 is not previously stored, the computing system 10 may generate an access ID of the debugger, which may access the computing system 10, and store the access ID of the debugger in the permission list List_Pms.

Figure 4D:
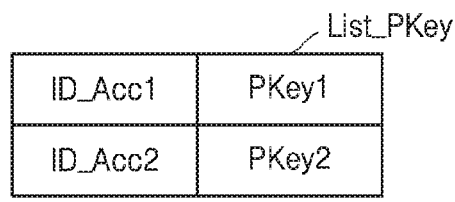

Referring to FIGS. 2 and 4D, a public key list List_PKey may include first and second access IDs ID_Acc1 and ID_Acc2 and first and second public keys PKey1 and PKey2. The first public key PKey1 may be a key distributed by the debugger, and the debugger may own a private key corresponding to the first public key PKey1. In an example, the debugger corresponding to the first access ID ID_Acc1 may distribute the first public key PKey1, and the debugger corresponding to the second access ID ID_Acc2 may distribute the second public key PKey2. Information encrypted using a public key may be decrypted using a private key owned by each debugger.

Referring back to FIGS. 2 and 4A to 4D, in an example, when a system crash occurs in the computing system 10, the debugger (refer to 20 in FIG. 1) may be connected to the computing system 10 and may output the second access ID ID_Acc2 corresponding to the debugger 20 and the third key ID ID_Key3 corresponding to the third area Rg3 to be accessed to the computing system 10.

When the security processor 100 receives the second access ID ID_Acc2 and the third key ID ID_Key3 from the debugger 20, the security processor 100 may request a user ID from the user and may receive the second user ID ID_User2. The security processor 100 may ascertain whether the second user ID ID_User2 is the user ID corresponding to the third key ID ID_Key3 based on the key list List_Key.

When the second user ID ID_User2 is the user ID corresponding to the third key ID ID_Key3, the security processor 100 may ascertain whether the second access ID ID_Acc2 received from the debugger 20 has authority to access the third area Rg3 corresponding to the third key ID ID_Key3 based on the permission list List_Pms.

In an exemplary embodiment, when the second access ID ID_Acc2 has authority to access the third area Rg3, the security processor 100 may obtain the second public key PKey2 corresponding to the second access ID ID_Acc2 based on the public key list List_PKey, may encrypt the third key Key3 corresponding to the third key ID ID_Key3 by using the second public key PKey2, and may output the encrypted third key Key3 to the debugger 20. The debugger 20 may decrypt the encrypted third key Key3 using the private key to obtain the third key Key3, and may decrypt data stored in the third area Rg3 by using the obtained third key Key3.

In an exemplary embodiment, when the second access ID ID_Acc2 has authority to access the third area Rg3, the security processor 100 may decrypt data stored in the third area Rg3 by using the third key Key3 and may output the decrypted data to the debugger 20.

Figure 5:
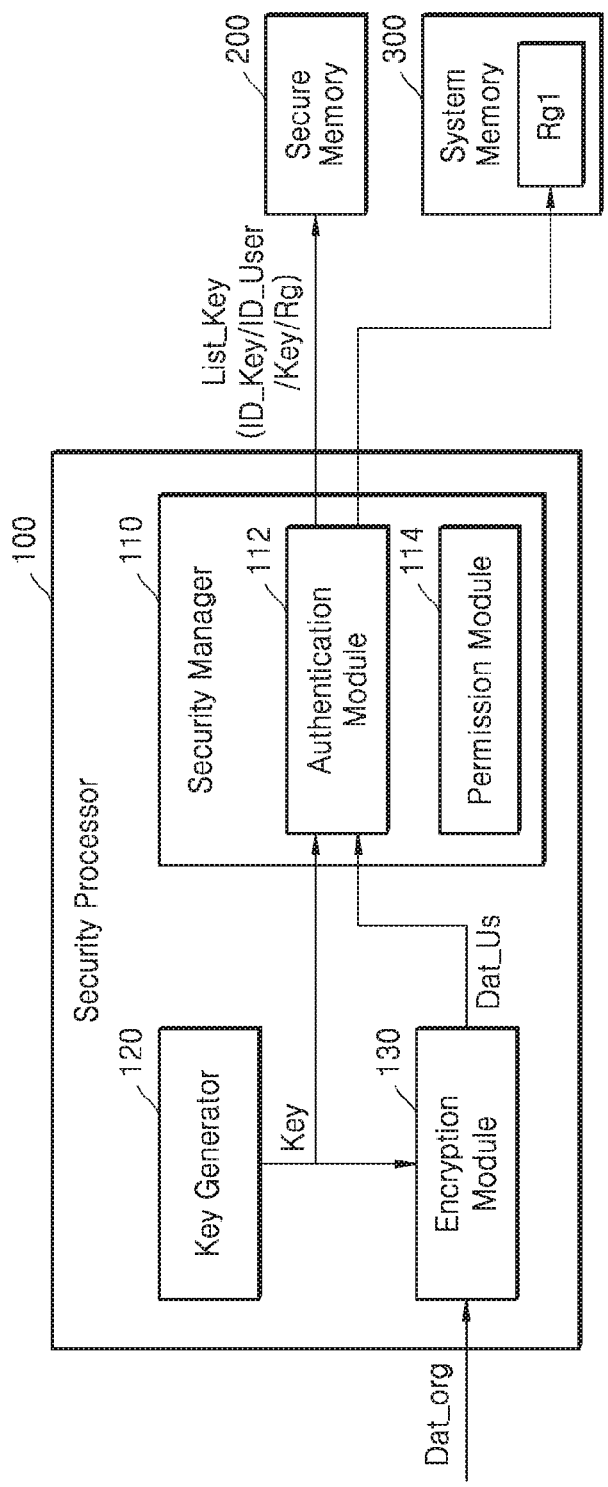
FIG. 5 is a block diagram illustrating an operation of a security processor according to an exemplary embodiment.

FIG. 5 is a block diagram illustrating an operation of a security processor 100 according to an exemplary embodiment. For example, FIG. 5 illustrates a method in which the security processor 100 encrypts original data Dat_Org and generates user data Dat_Us. For convenience of explanation, a further description of elements and technical aspects previously described may be omitted.

Referring to FIG. 5, the key generator 120 may generate a key Key and output the generated key Key to the encryption module 130 and the authentication module 112. The encryption module 130 may receive the original data Dat_org, encrypt the original data Dat_org using the key Key, and generate the user data Dat_Us. The encryption module 130 may output the generated user data Dat_Us to the authentication module 112.

The authentication module 112 may store the received key Key and a key ID ID_Key along with the user data Dat_Us in the first area Rg1 of the system memory 300. In an example, the authentication module 112 may store the user data Dat_Us and the key ID ID_Key in the system memory 300 using the mail box module (refer to 140 in FIG. 3) and the memory controller (refer to 480 in FIG. 3).

The authentication module 112 may obtain a user ID ID_User of a current user based on user information (refer to Info_User in FIG. 4A) stored in the secure memory 200, generate a key list List_Key by using area information Rg including the obtained user ID ID_User, the key ID ID_Key, the key Key, and the user data Dat_Us, and store the generated key list List_Key in the secure memory 200. In an example, the authentication module 112 may store the key list List_Key in the secure memory 200 using the secure memory controller (refer to 150 in FIG. 3).

FIG. 6 is a flowchart illustrating an operation of the security processor 100 according to an exemplary embodiment. For example, FIG. 6 illustrates a method S100 in which the security processor 100 encrypts original data.

Referring to FIGS. 5 and 6, the security processor 100 may receive original data Dat_org (S110), and may encrypt the original data Dat_org using a key Key and generate user data Dat_Us (S120). The security processor 100 may generate a key ID ID_Key using the key Key (S130), and may store the user data Dat_Us in a secure area of the system memory 300 along with the key ID ID_Key (S140).

The security processor 100 may obtain a user ID ID_User stored in the secure memory 200 (S150) and update a key list List_Key stored in the secure memory 200 using the obtained user ID ID_User, the key Key, the key ID ID_Key, and the secure area (S160). In an example, the user ID ID_User may be a user ID of a user when a system crash occurs in the computing system 10.

Figure 7A:
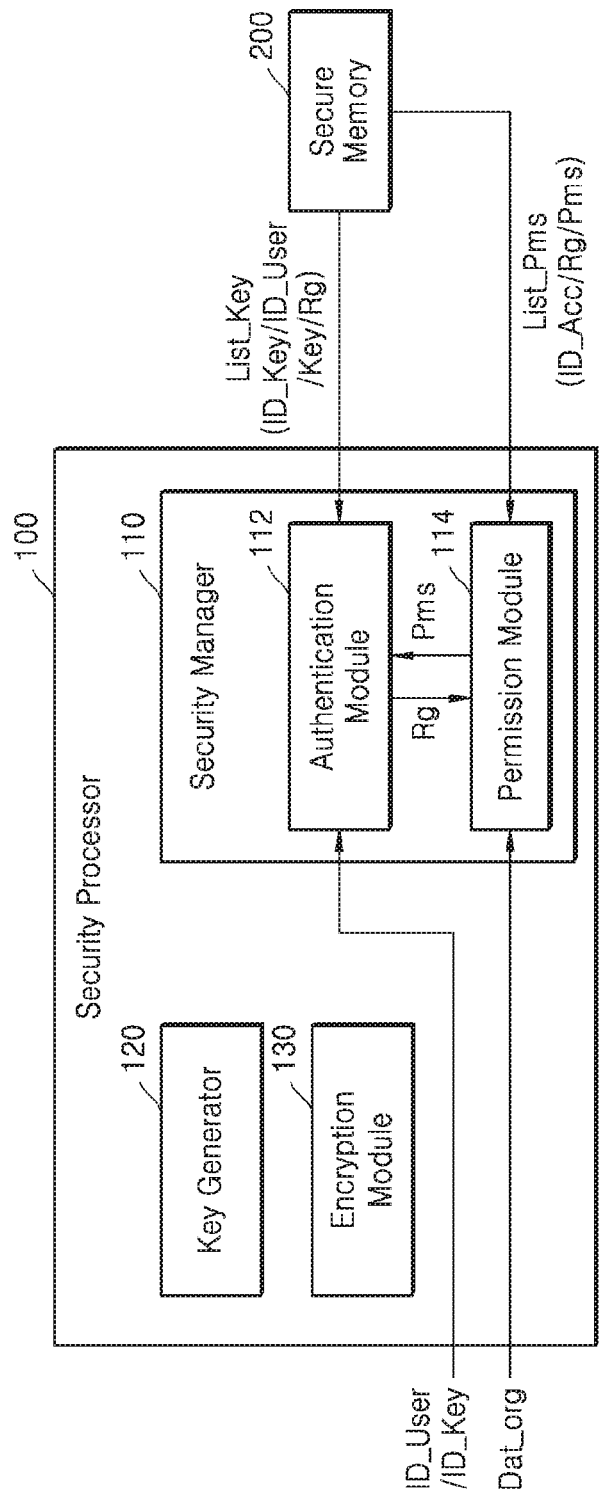
FIGS. 7A and 7B are block diagrams illustrating operations of a security processor according to an exemplary embodiment.
Figure 7B:
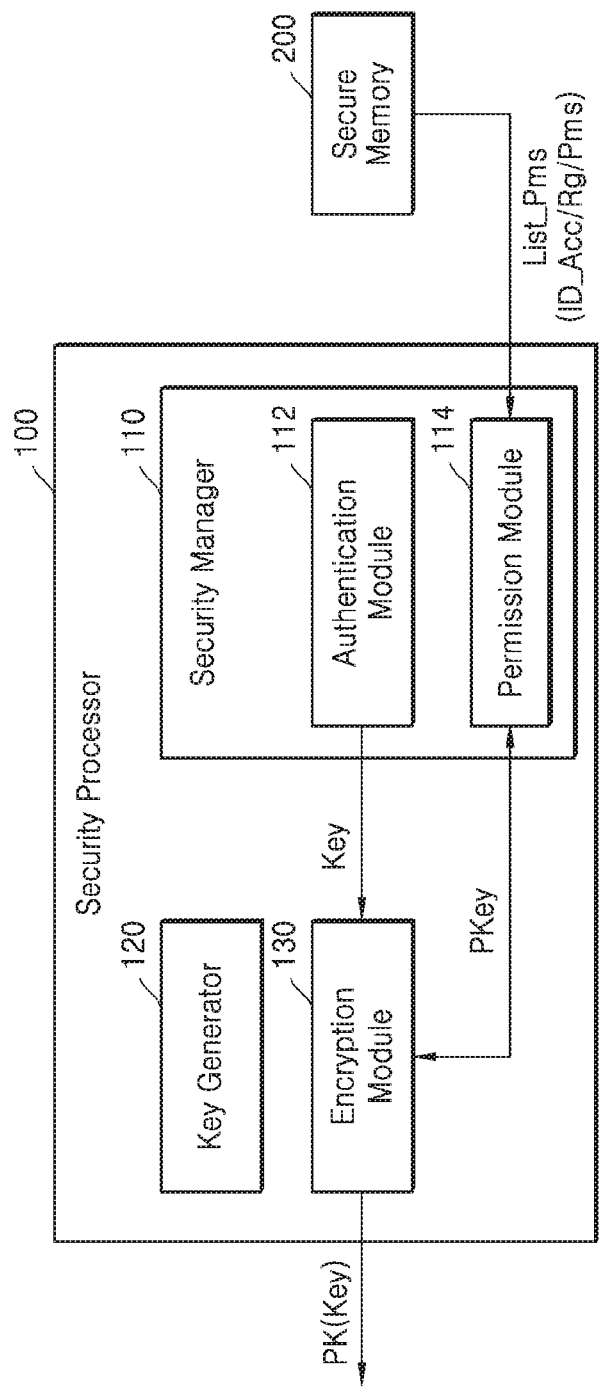

FIGS. 7A and 7B are block diagrams illustrating operations of the security processor 100 according to an exemplary embodiment. For example, FIGS. 7A and 7B illustrate operations of authenticating a user ID and an access ID on the security processor 100.

Referring to FIG. 7A, the authentication module 112 may receive a user ID ID_User from a user and receive a key ID ID_Key from the debugger (refer to 20 in FIG. 1). The authentication module 112 may obtain a key list List_Key from the secure memory 200 and obtain area information Rg corresponding to the key ID ID_Key using the key list List_Key.

The permission module 114 may receive an access ID ID_Acc from the debugger 20 and obtain a permission list List_Pms from the secure memory 200. The permission module 114 may determine whether the access ID ID_Acc is granted access to the area information Rg received from the authentication module 112 based on the permission list List_Pms. When a permission Pms corresponding to the access ID ID_Acc is granted, the permission module 114 may output the permission Pms to the authentication module 112. When a plurality of pieces of area information Rg correspond to the access ID ID_Acc, the permission module 114 may sequentially receive the plurality of pieces of area information Rg and sequentially output respective permissions Pms to access the plurality of pieces of area information Rg.

Referring to FIG. 7B, the authentication module 112 may output a key Key corresponding to the area information Rg to the encryption module 130 in response to the permission Pms. The permission module 114 may obtain a public key list List_Key from the secure memory 200 and output a public key PKey corresponding to the access ID ID_Acc to the encryption module 130 based on the public key list List_Key. The encryption module 130 may encrypt the key Key using the public key PKey and output an encrypted key PK(Key) to the debugger (refer to 20 in FIG. 1).

FIG. 8 is a flowchart illustrating an operation of the security processor 100 according to an exemplary embodiment. For example, FIG. 8 illustrates an operation S200 of authenticating a user ID ID_User and an access ID ID_Acc on the security processor 100.

Referring to FIGS. 7A, 7B, and 8, the security processor 100 may receive the user ID ID_User and a user password Pw_User from a user, and receive a key ID ID_Key and the access ID ID_Acc from the debugger (refer to 20 in FIG. 1)

(S210), and may verify the user ID ID_User and the user password Pw_User based on user information stored in the secure memory 200 (S220).

When the received user ID ID_User and user password Pw_User match a user ID ID_User and a user password Pw_User stored in the secure memory 200, thus indicating that the user is a legitimate user (S230), the security processor 100 may obtain secure area information Rg corresponding to the received key ID ID_Key based on a key list List_Key stored in the secure memory 200 (S240). The security processor 100 may determine whether the access ID ID_Acc is granted a permission Pms to access a secure area based on a permission list List_Pms stored in the secure memory 200 (S250).

When the access ID ID_Acc is granted access to the secure area (S260), the security processor 100 may obtain a public key PKey corresponding to the access ID ID_Acc based on a public key list List_PKey stored in the secure memory 200 (S270). The security processor 100 may encrypt a key Key using the public key PKey and output the encrypted key Key (S280).

Figure 9:
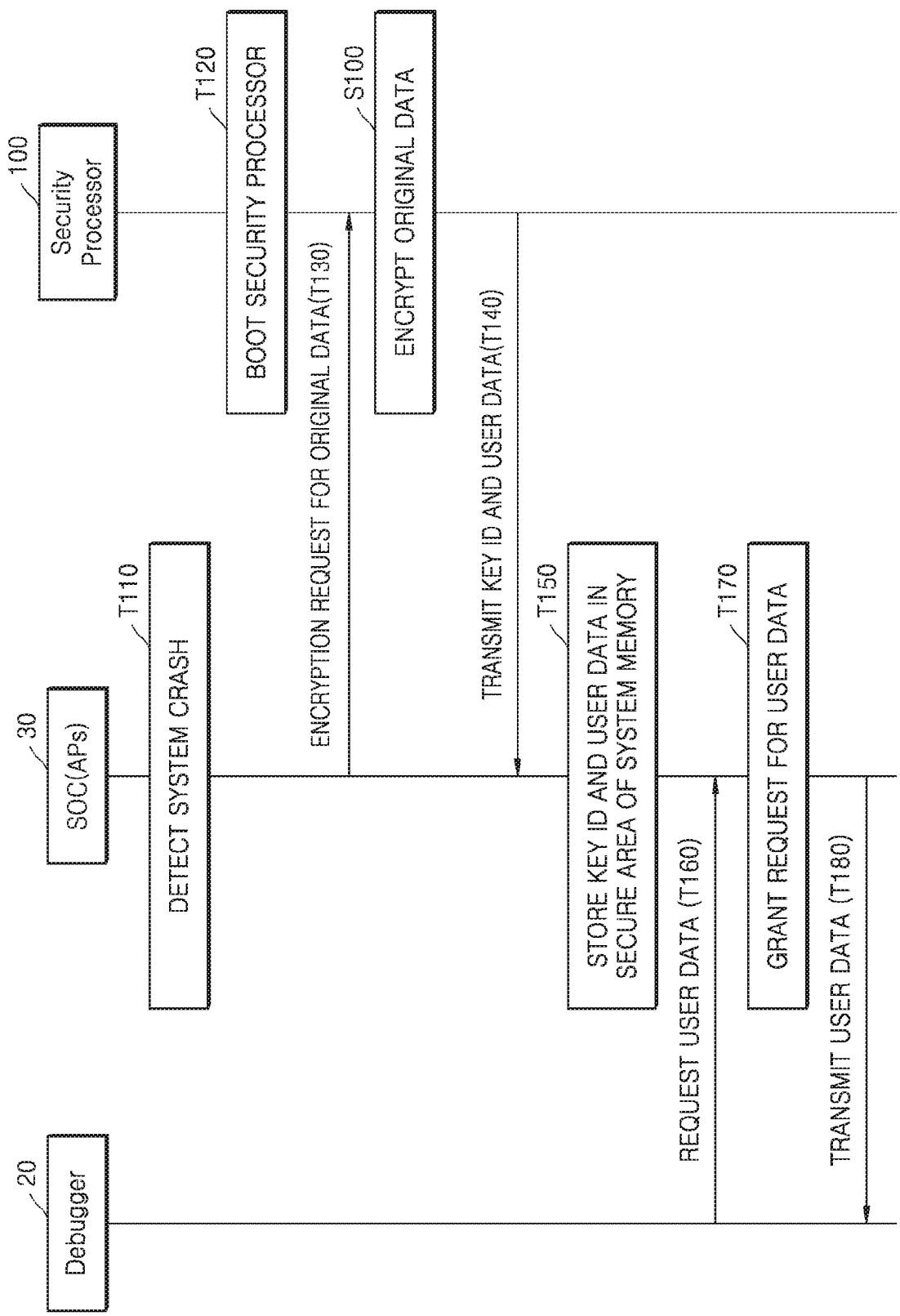
FIG. 9 is a flowchart illustrating a method of operating a diagnostic system according to an exemplary embodiment.

FIG. 9 is a flowchart illustrating a method of operating a diagnostic system according to an exemplary embodiment. For example, FIG. 9 illustrates a process of obtaining user data by the debugger 20 with respect to time when a system crash occurs.

Referring to FIG. 9, the SoC 30 may detect a system crash (T110), and the security processor 100 may be booted (T120). The SoC 30 (e.g., a plurality of application processors) may output an encryption request for original data to the security processor 100 (T130). The security processor 100 may encrypt the original data using the method described above with reference to FIGS. 5 and 6 (S100). The security processor 100 may transmit user data generated by encrypting the original data and a key ID corresponding to a key used to encrypt the user data to the SoC 30 (T140). The SoC 30 may store the received key ID and user data in a secure area of the system memory (T150).

Thereafter, the debugger 20 may make a request for user data to the SoC 30 (T160), and the SoC 30 may grant the request for the user data (T170). The SoC 30 may then transmit the user data to the debugger 20 (T180).

Figure 10:
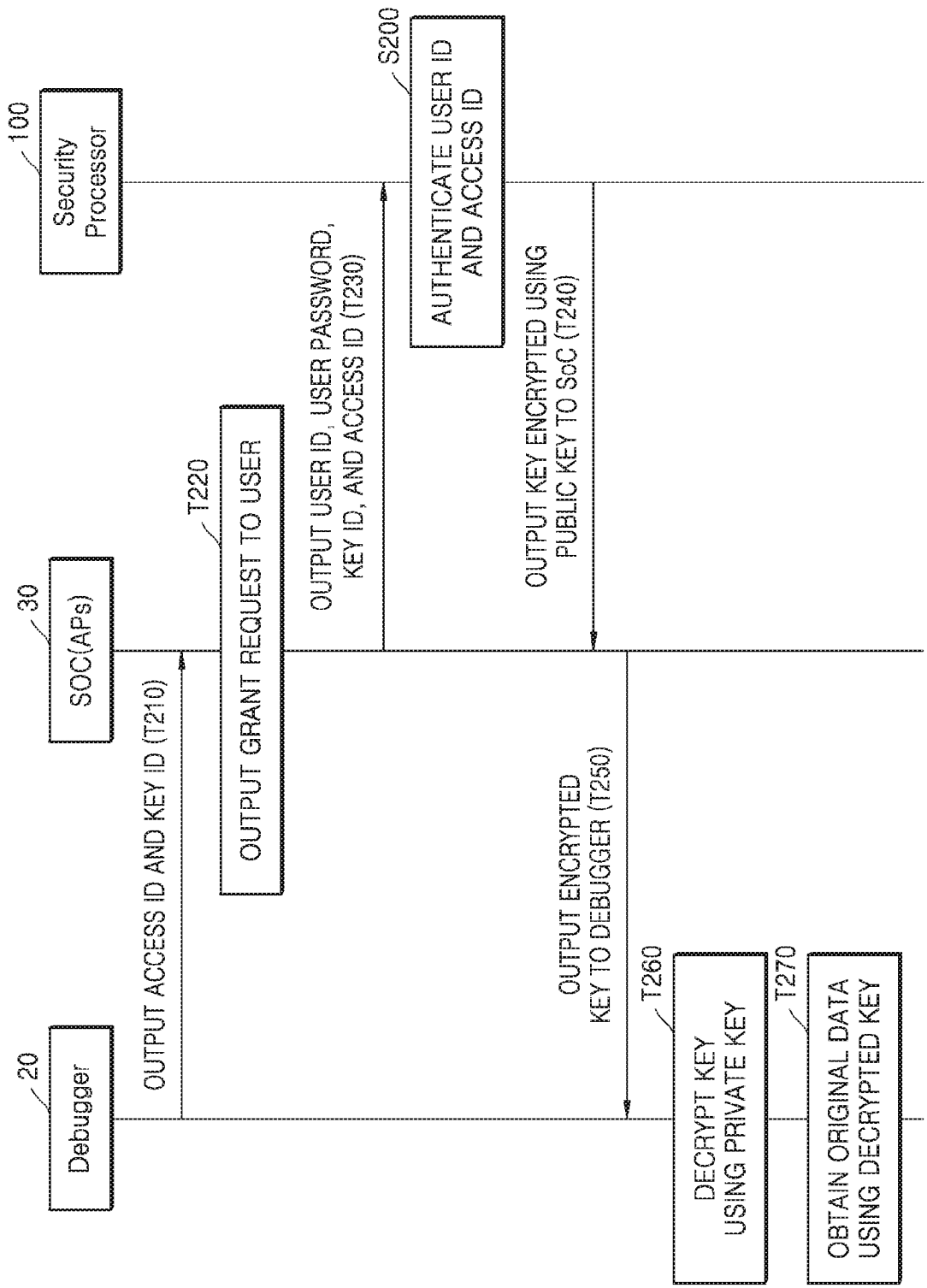
FIG. 10 is a flowchart illustrating a method of operating a diagnostic system according to an exemplary embodiment.

FIG. 10 is a flowchart illustrating a method of operating a diagnostic system according to an exemplary embodiment. For example, FIG. 10 illustrates a process of obtaining original data by the debugger 20 with respect to time.

Referring to FIG. 10, after the debugger 20 obtains user data, the debugger 20 may output a key ID stored in a secure area to the SoC 30 along with an access ID and the user data to decrypt the user data (T210). Also, the SoC 30 may output a grant request for the output of the user data to a user (T220).

In an example, the SoC 30 may output a phrase informing the user of the output of the user data through a display device included in the computing system (refer to 10 in FIG. 1), and the user may grant the output of the user data in various ways that the user perceives. In an example, the SoC 30 may display a predetermined phrase indicating the output of the user data to the user, and the user may confirm that the user has recognized the output of the user data using various methods, such as, for example, signature, login, and the registration of biometric information. The user's grant may be used to prevent the user from denying the output of user data afterwards.

When the output of the user data is granted using the above-described method, the SoC 30 may output a user ID and a user password of the user, the key ID, and the access ID to the security processor 100 (T230). The user ID and the user password of the user may be obtained by the user's grant as described above, and the key ID and the access ID may be received from the debugger 20.

The security processor 100 may authenticate the user ID and the access ID using the method described above with reference to FIGS. 7A to 8 (S200). When the user ID and the access ID are authenticated, the security processor 100 may output a key, which has been encrypted using a public key, to the SoC 30 (T240). The SoC 30 may output the encrypted key received from the security processor 100 to the debugger 20 (T250).

The debugger 20 may decrypt the encrypted key into the public key using a private key. Accordingly, the debugger 20 may obtain the key used to encrypt the user data (T260). The debugger 20 may decrypt the user data using the decrypted key and obtain original data (T270).

Figure 11:
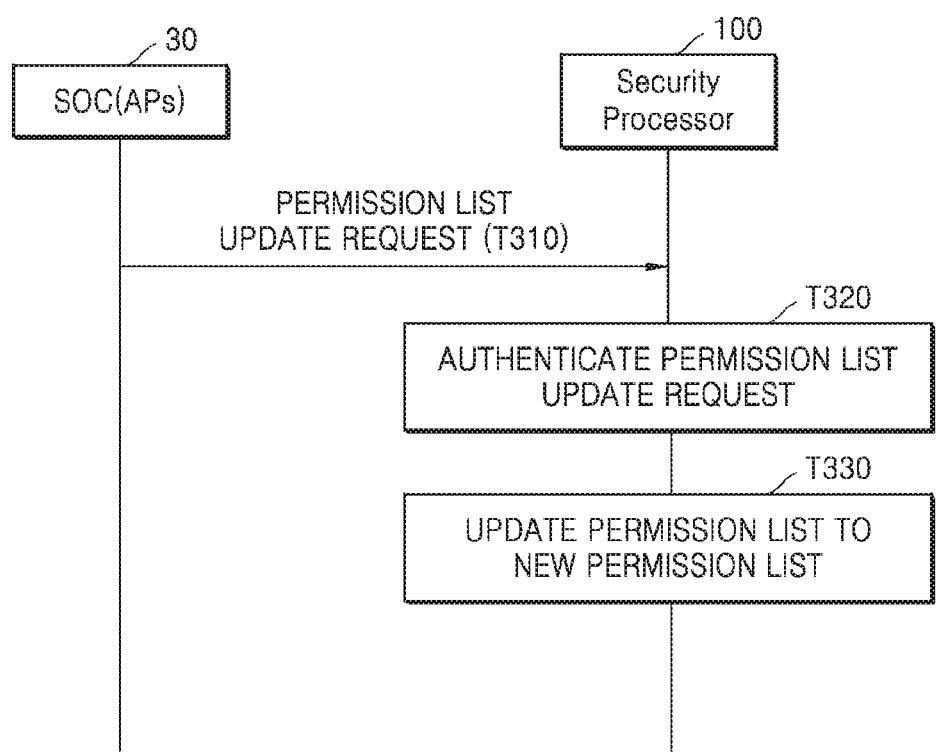
FIG. 11 is a flowchart illustrating an operation of a computing system according to an exemplary embodiment.

FIG. 11 is a flowchart illustrating an operation of a computing system according to an exemplary embodiment. For example, FIG. 11 illustrates a process of updating a permission list with respect to time.

Referring to FIG. 11, the SoC 30 may output a permission list update request to the security processor 100 (T310). In an example, a first access ID, which has been granted access to first user data, may be subsequently denied access to the first user data due to a policy change. In this case, the SoC 30 may request the security processor 100 to update the permission list such that the first access ID is denied access to the first user data.

The security processor 100 may authenticate the permission list update request (T320). In an example, the security processor 100 may compare a signature included in the permission list update request with a signature included in a permission list stored in a secure memory, and may perform an operation in response to the permission list update request when the two signatures match.

The security processor 100 may update the permission list stored in the secure memory to a new permission list included in the received permission list update request (T330). In an example, the security processor 100 may update the permission list by changing contents of the permission list stored in the secure memory, which are different from those of the new permission list included in the permission list update request.

Although FIG. 11 illustrates a method of specifically updating the permission list, it will be understood by one of ordinary skill in the art that the key list List_Key, the public key list List_PKey, and the user information Info_User shown in FIGS. 4A to 4D may be updated using similar methods.

In an exemplary embodiment, the security processor 100 may receive an addition request for adding new user IDs (refer to ID_User1 to ID_User3 in FIG. 4B) to a key list (refer to List_Key in FIG. 4B), from the SoC 30, and may add the received new user IDs to the key list in response to the addition request. In an exemplary embodiment, the security processor 100 may receive a deletion request for deleting at least one user ID included in the key list from the key list, from the SoC 30, and may delete the at least one user ID from the key list in response to the deletion request.

Figure 12:
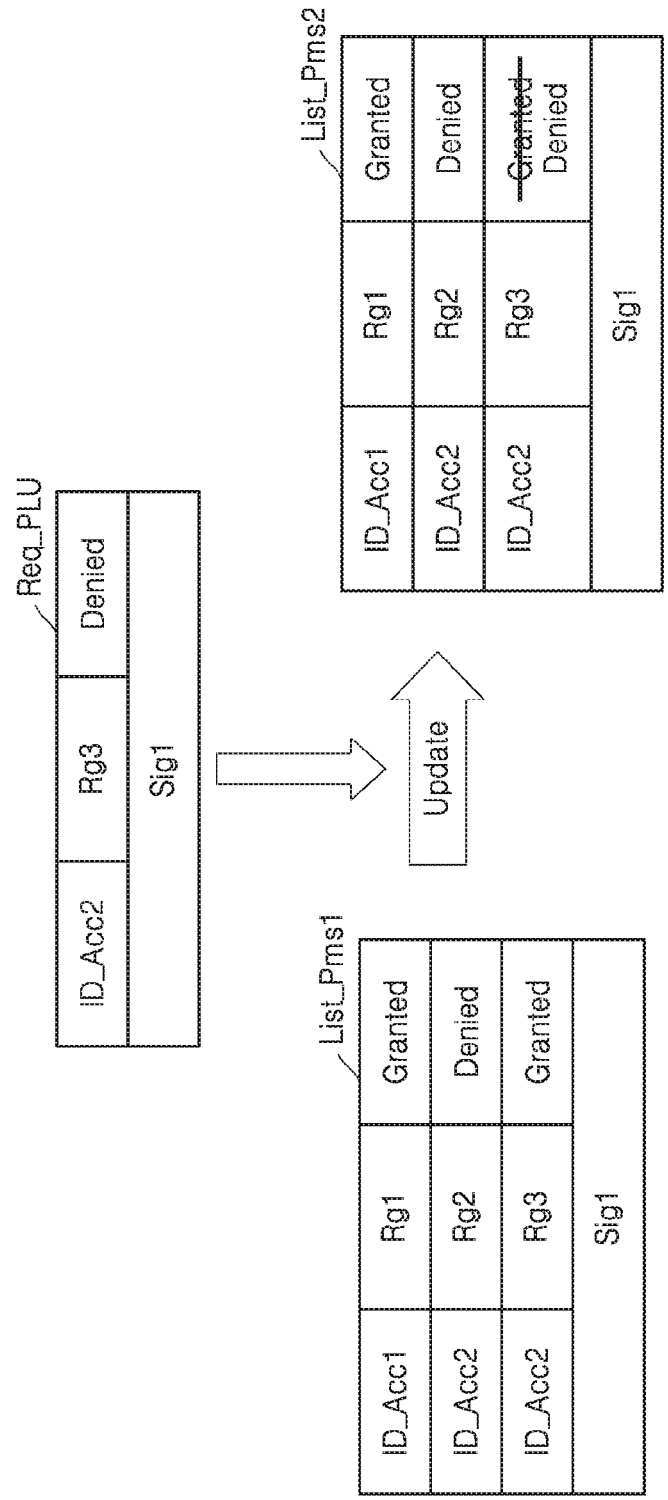
FIG. 12 is a diagram illustrating an operation of a computing system according to an exemplary embodiment.

FIG. 12 is a diagram illustrating an operation of a computing system according to an exemplary embodiment. For example, FIG. 12 illustrates a process of updating a permission list.

Referring to FIGS. 11 and 12, when the security processor 100 receives a permission list update request Req_PLU, the security processor 100 may obtain a first permission list List_Pms1 from the secure memory 200. The security processor 100 may determine whether signature information Sig1 stored in the first permission list List_Pms1 matches signature information Sig1 stored in the permission list update request Req_PLU.

When the signature information Sig1 stored in the first permission list List_Pms1 matches the signature information Sig1 stored in the permission list update request Req_PLU, the security processor 100 may update information of the first permission list List_Pms1, which is different from the permission list update request Req_PLU.

In the example of FIG. 12, since access to a third area Rg3 of a second access ID ID_Acc2 included in the permission list update request Req_PLU is denied, the security processor 100 may correct access to the third area Rg3 of the second access ID ID_Acc2 from 'Granted' to 'Denied' in the first permission list List_Pms1 to generate a second permission list List_Pms2, and may store the generated second permission list List_Pms2 in the secure memory 200.

When permission information corresponding to an access ID is changed due to, for example, a policy change, etc., the security processor 100 according to an exemplary embodiment may efficiently control authority for each access ID by updating the permission list.

Figure 13:
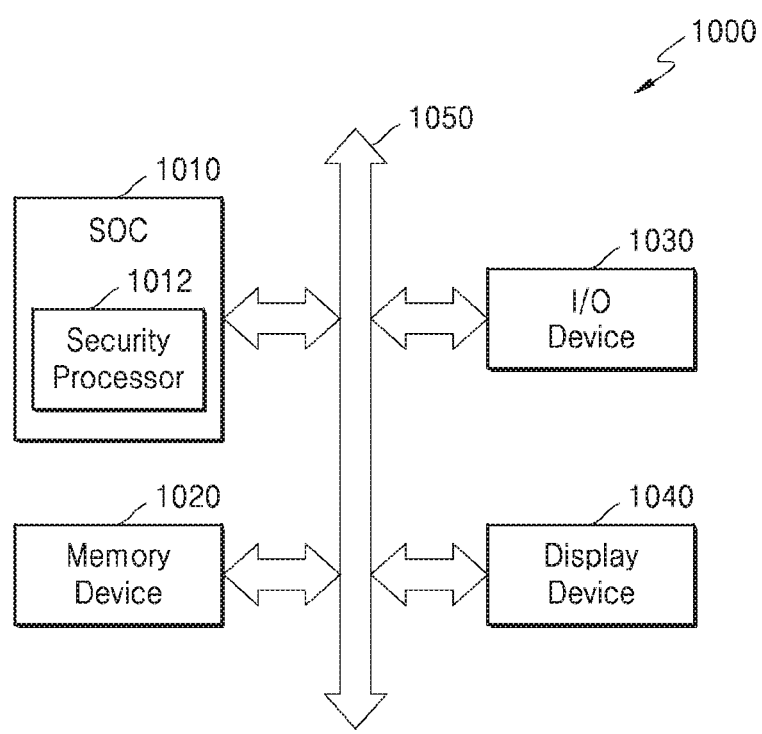
FIG. 13 is a diagram of a computing system according to an exemplary embodiment.

FIG. 13 is a diagram of a computing system 1000 according to an exemplary embodiment.

Referring to FIG. 13, the computing system 1000 may include an SoC 1010, a memory device 1020, an input/output (I/O) device 1030, and a display device 1040, which may be electrically connected to one another via a bus 1050.

Also, the SoC 1010 may include a security processor 1012, which may perform various operations described above with reference to FIGS. 1 to 12. In addition, the SoC 1010 may also perform various operations described above with reference to FIGS. 1 to 12. For example, the security processor 1012 may correspond to the security processor 100 described above, and the SoC 1010 may correspond to the SoC 30 described above.

The memory device 1020 may operate as the system memory 300 described above with reference to FIGS. 1 to 12 and may store a key ID and a user ID in each secure area. The display device 1040 may output an authentication phrase to a user under the control of the SoC 1010. The I/O device 1030 may receive various requests or data from the debugger 20 described above with reference to FIGS. 1 to 12, or may transmit various pieces of data to the debugger 20.

According to an exemplary embodiment, the SoC 1010 may perform authentication operations on the user and the debugger 20, and may determine whether the debugger 20 is granted access to user data stored in the memory device 1020.

As is traditional in the field of the inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

As will be appreciated by one skilled in the art, aspects of the inventive concept may be embodied as a system, method or computer program product. Accordingly, aspects of the inventive concept may take the form of an entirely hardware embodiment, an entirely software embodiment (including firmware, resident software, micro-code, etc.) or an embodiment combining software and hardware aspects that may all generally be referred to herein as a "circuit," "module," "unit" or "system." Furthermore, aspects of the inventive concept may take the form of a computer program product embodied in one or more computer readable medium(s) having computer readable program code embodied thereon. If implemented in software, the functions may be stored on or transmitted over as one or more instructions or code on a tangible, non-transitory computer-readable medium.

Herein, the term "circuit" may refer to an analog circuit or a digital circuit. In the case of a digital circuit, the digital circuit may be hard-wired to perform the corresponding tasks of the circuit, such as a digital processor that executes instructions to perform the corresponding tasks of the circuit. Examples of such a processor include an application-specific integrated circuit (ASIC) and a field-programmable gate array (FPGA).

While the inventive concept has been particularly shown and described with reference to the exemplary embodiments thereof, it will be understood that various changes in form and detail may be made therein without departing from the spirit and scope of the inventive concept as defined by the following claims.

What is claimed is:

1. A security processor, comprising:
a key generator circuit configured to randomly generate a key;
an encryption circuit configured to encrypt user data based on the key; and
a security manager circuit configured to receive a first user identification (ID), which uniquely corresponds to a user of a device, and determine whether to allow access to the user data by authenticating the first user ID,
wherein the security manager circuit comprises an authentication circuit configured to generate a key list comprising an authorized user ID of an authorized user having authority to access the user data, area information about an area of a system memory in which the user data is stored, and the key used to encrypt the user data,
wherein the security manager circuit is further configured to store the generated key list in a secure memory different from the system memory, and the secure memory is accessible only to the security processor.

2. The security processor of claim 1, wherein the security manager circuit is further configured to generate
a permission list comprising an authorized access ID having access authority for the user data, the area information, and information about whether access to the user data is granted, and
a public key list comprising an access ID and correspondence information about a public key corresponding to the access ID,
wherein the security manager circuit is further configured to store the generated permission list and the generated public key list in the secure memory.

3. The security processor of claim 2, wherein the security manager circuit is further configured to update at least one of the key list, the permission list, and the public key list based on a request from the user of the device.

4. The security processor of claim 1, wherein the security manager circuit further comprises:
a permission circuit configured to receive a first access ID and determine whether the first access ID has access authority for the user data,
wherein the authentication circuit is further configured to determine whether the user of the device is authorized to access the user data based on the first user ID.

5. The security processor of claim 4, wherein
the authentication circuit is further configured to determine whether the first user ID matches the authorized user ID based on the key list, and determine whether the user of the device is authorized to access the user data.

6. The security processor of claim 5, wherein the authentication circuit is further configured to generate a key ID corresponding to the key and generate the key list by adding the generated key ID to the key list,
wherein the generated key ID is stored in the system memory together with the user data.

7. The security processor of claim 4, wherein the permission circuit is further configured to generate a permission list comprising an authorized access ID having access authority for the user data, area information about an area of the system memory in which the user data is stored, and information about whether access to the user data is granted, and
the permission circuit is further configured to determine whether the first access ID matches the authorized access ID based on the permission list, and determine whether to authorize the first access ID to access the user data.

8. The security processor of claim 7, wherein, when the first access ID matches the authorized access ID, the permission circuit is further configured to encrypt the user data using a public key corresponding to the first access ID and output the encrypted user data.

9. The security processor of claim 7, wherein the permission circuit is further configured to output the key when the first access ID matches the authorized access ID.

10. The security processor of claim 9, wherein the authentication circuit is further configured to generate a first key ID corresponding to the key and store the generated first key ID in the system memory with the user data,
the permission circuit is further configured to receive the first access ID and the first key ID and output a public key corresponding to the first access ID to the encryption circuit when the first access ID matches the authorized access ID, and
the encryption circuit is further configured to encrypt the key using the public key, and output the encrypted key.

11. The security processor of claim 10, wherein the permission circuit is further configured to generate a public key list comprising the first access ID and correspondence information about the public key corresponding to the first access ID.

12. A computing system, comprising:
a security processor configured to randomly generate a key and encrypt user data based on the key;
a secure memory accessible only to the security processor; and
a system memory, different from the secure memory, configured to store the encrypted user data in any one of a plurality of secure areas,
wherein the security processor is configured to receive a first user identification (ID), which uniquely corresponds to a user of a device, and determine whether to allow access to a first secure area in which the user data is stored, from among the plurality of secure areas, by authenticating the first user ID,
wherein the security processor is further configured to generate a key list comprising an authorized user ID of an authorized user having authority to access the user data, area information about an area of the system memory in which the user data is stored, and the key used to encrypt the user data,
wherein the security processor is further configured to store the generated key list in the secure memory.

13. The computing system of claim 12, wherein the security processor is further configured to determine whether the user of the device is authorized to access the user data based on the first user ID, receive a first access ID, and determine whether the first access ID has access authority for the user data.

14. The computing system of claim 13, wherein the security processor is further configured to generate
a permission list comprising an authorized access ID having access authority for the user data, the area information, and information about whether access to the user data is granted, and
a public key list comprising an access ID and correspondence information about a public key corresponding to the access ID,
wherein the security processor is further configured to store the generated permission list and the generated public key list in the secure memory.

15. The computing system of claim 13, wherein
the security processor is further configured to determine whether the first user ID matches the authorized user ID based on the key list, and determine whether the user of the device is authorized to access the user data.

16. The computing system of claim 13, wherein the security processor is further configured to generate a permission list comprising an authorized access ID having access authority for the user data, area information about an area of the system memory in which the user data is stored, and information about whether access to the user data is granted, and
the security processor is further configured to determine whether the first access ID matches the authorized access ID based on the permission list, and determine whether to authorize the first access ID to access the user data.

17. The computing system of claim 16, wherein the security processor is further configured to output the key when the first access ID matches the authorized access ID.

18. The computing system of claim 17, wherein the security processor is further configured to generate a first key ID corresponding to the key and store the generated first key ID in the system memory with the user data, and
the security processor is further configured to encrypt the key using a public key corresponding to the first access ID, and to output the encrypted key when the first access ID matches the authorized access ID.

19. A diagnostic system, comprising:
a computing system comprising a security processor, a secure memory accessible only to the security processor, and a system memory different from the secure memory,
wherein the computing system is configured to randomly generate a key, encrypt user data based on the key, and store the encrypted user data; and
a debugger configured to output an access identification (ID) to the computing system, obtain the user data, and diagnose an error in the computing system,
wherein the computing system is configured to determine whether the access ID is an authorized access ID having access authority for the user data, and authorize the debugger to access the user data based on determining whether the access ID is the authorized access ID,
wherein the computing system is further configured to generate a key list comprising an authorized user ID of an authorized user having authority to access the user data, area information about an area of the system memory in which the user data is stored, and the key used to encrypt the user data,
wherein the computing system is further configured to store the generated key list in the secure memory.

* * * * *